Aug. 29, 1967     K. E. HOEL     3,339,131
MULTI-SPEED, SELF-EXCITED AC MOTOR SYSTEM
Filed April 12, 1965     3 Sheets-Sheet 1
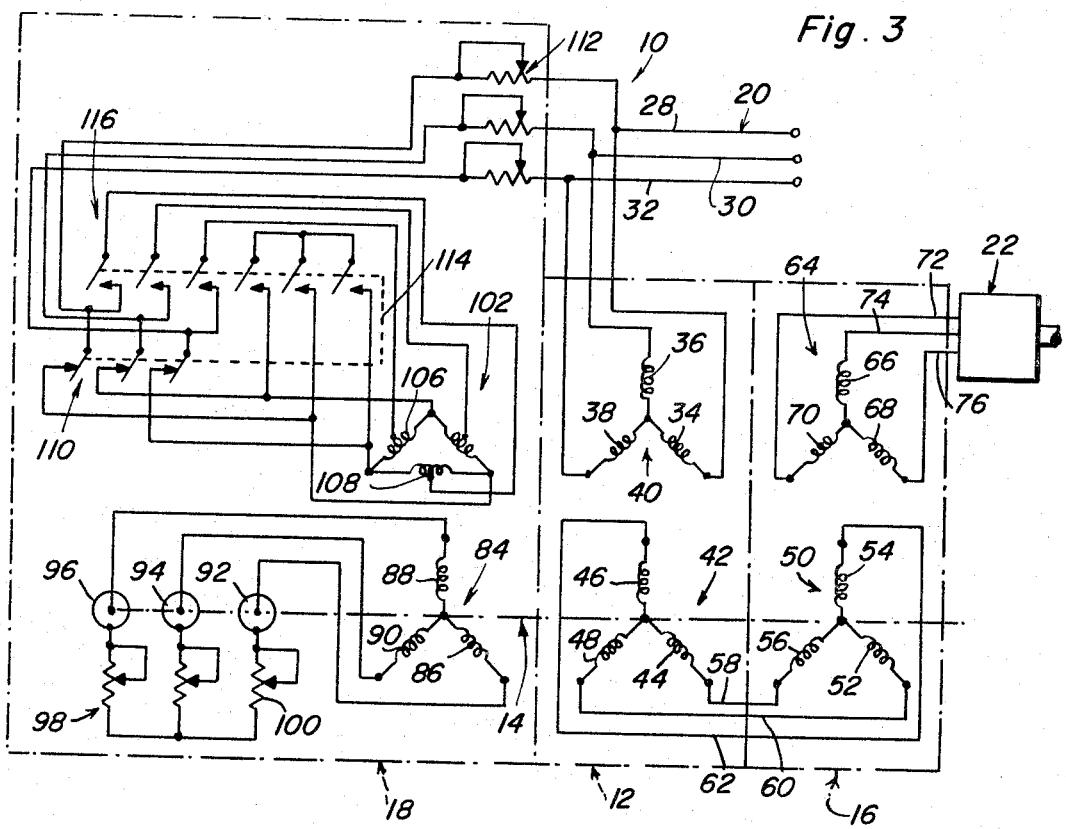
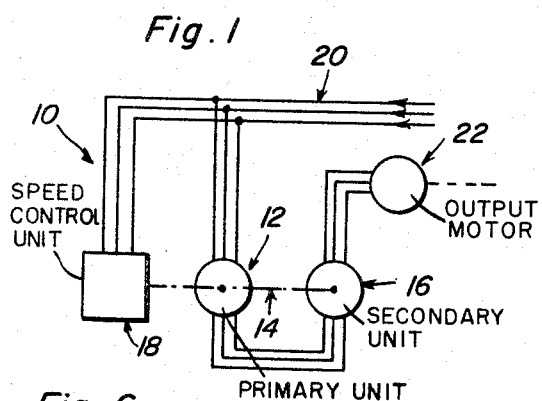
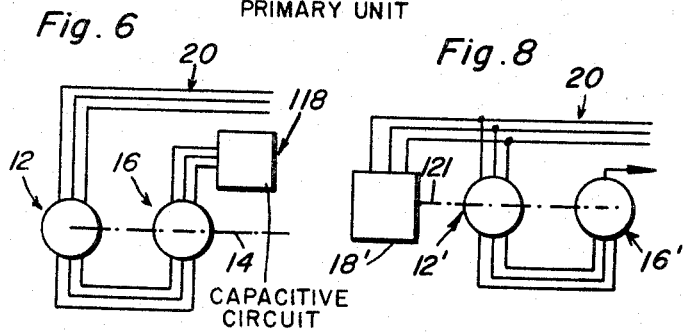
Kenneth E. Hoel
INVENTOR.

Aug. 29, 1967  K. E. HOEL  3,339,131
MULTI-SPEED, SELF-EXCITED AC MOTOR SYSTEM
Filed April 12, 1965  3 Sheets-Sheet 2

Kenneth E. Hoel
INVENTOR.

Aug. 29, 1967  K. E. HOEL  3,339,131
MULTI-SPEED, SELF-EXCITED AC MOTOR SYSTEM
Filed April 12, 1965  3 Sheets-Sheet 3

Kenneth E. Hoel
INVENTOR.

BY Clarence A. O'Brien
and Harvey B. Jacobson
Attorneys

United States Patent Office 3,339,131
Patented Aug. 29, 1967

3,339,131
MULTI-SPEED, SELF-EXCITED AC MOTOR SYSTEM
Kenneth E. Hoel, Rte. 2, Box 1D,
Sunnyside, Wash. 98944
Filed Apr. 12, 1965, Ser. No. 447,339
4 Claims. (Cl. 318—49)

ABSTRACT OF THE DISCLOSURE

A pair of motors having mechanically interconnected wire wound rotors, the windings of which are electrically interconnected to produce magnetic fields rotating electrically in opposite directions when a constant AC voltage is applied to the stator winding of one of the motors. The electrical output obtained from the stator winding of the other motor is varied in accordance with the mechanical speed to which the rotors are regulated by a speed control unit.

---

This invention relates to alternating current type of electric motors. More particularly, the present invention pertains to electrical motor systems energized by an alternating current source without any DC field excitation and employing wound rotors.

One important object of the present invention, is to provide a motor system which operates only from an AC source of electrical energy and does not involve any commutators or arcing parts so that it may be operated more efficiently and constructed in a more simple fashion. A motor system may therefore be constructed in accordance with the present invention which is lighter and smaller than motor systems having comparable torque and acceleration characteristics.

An additional object of the present invention is to provide a self-excited motor system operating on AC current without heating at slow speeds and requiring less maintenance as compared to machines having comparable characteristics.

An additional object of the present invention is to provide a motor system of the variable output speed type operating with a constant input current and voltage.

A still further object of the present invention is to provide a motor system having a constant output power characteristic operating on AC current.

Yet another object of the present invention is to provide an AC motor system having a controlled output speed within a speed range varying from a very slow speed to almost full synchronous speed corresponding to the alternating frequency current of the source of energy.

Another object of the present invention in accordance with the foregoing objects, is to provide a motor control system within which a pair of wound rotor assemblies are rotated in the same direction but are electrically interconnected so that they conduct current in opposite phase rotation. The rotor assemblies are respectively associated with stator assemblies within which magnetic fields are produced tending to rotate in opposite electrical directions so that rotation of the rotor assemblies in the same mechanical direction will vary the electrical rotation of the magnetic field in one of the stator assemblies between zero and a value approaching the synchronous speed of the other stator assembly. Thus, by controlling the speed or load on the interconnected rotor assemblies, one of the stator assemblies may be supplied with electrical energy from the source in order to produce a regulated electrical or mechanical output by virtue of the magnetic coupling of one of the rotor assemblies to either an output stator assembly or another rotor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic illustration of one form of motor system in accordance with the present invention;

FIGURE 2 is a graphical illustration showing the operating characteristics of the motor system depicted in FIGURE 1;

FIGURE 3 is an electrical circuit diagram corresponding to the motor system illustrated in FIGURE 1;

FIGURE 6 is a schematic diagram of another form of motor system in accordance with the present invention;

FIGURE 8 is a schematic diagram of yet another form of motor system in accordance with the present invention;

Figure 4:
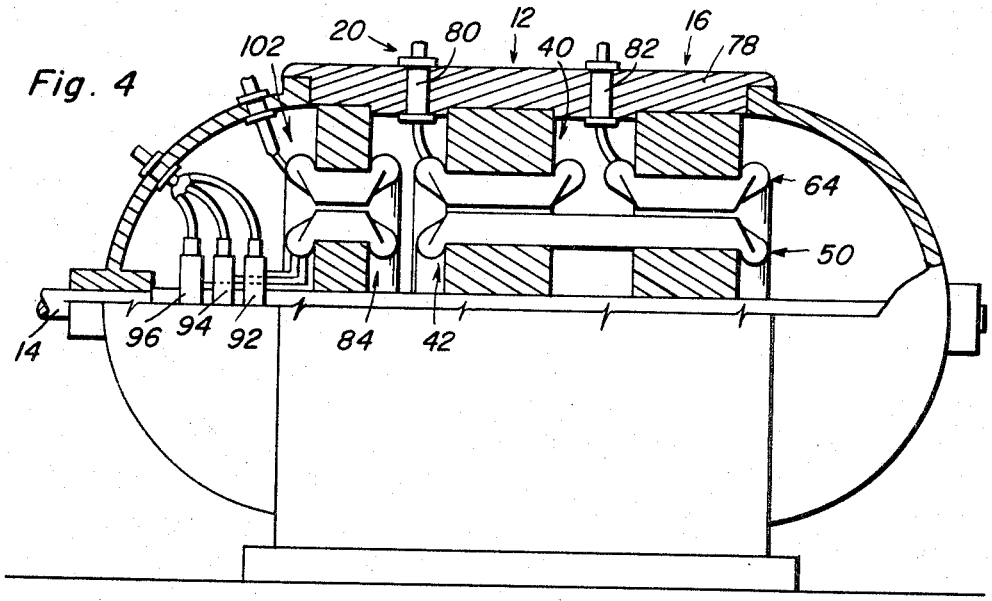
FIGURE 4 is a partial sectional view through a frequency control unit associated with the motor system of FIGURES 1 and 3.

Referring now to the drawings in detail, FIGURE 1 illustrates schematically a motor system generally denoted by reference numeral 10 having operating characteristics such as graphically depicted in FIGURE 2. As shown in FIGURE 1, the motor system includes a primary motor assembly generally referred to by reference numeral 12 having an armature assembly mounted on a common armature supporting shaft 14 associated with the armature assembly of a secondary motor unit 16. The shaft 14 is also associated with an armature assembly within a speed control unit generally referred to by reference numeral 18. Electrical energy is supplied to the system from an alternating current source by means of the power lines generally referred to by reference numeral 20. The power lines are connected to both the primary motor unit 12 and the speed control unit 18. The electrical output from the secondary unit 16 is supplied to an output motor 22 from which a mechanical output is obtained. The output motor 22 may be of a multispeed synchronous type or a DC excited synchronous type. Accordingly, the output speed of the motor 22 will depend upon the frequency of the alternating current supplied thereto from the secondary unit 16. With a constant input as graphically shown by the input voltage and current curve 24 in FIGURE 2, the output speed from the output motor 22 may be varied within a predetermined range producing an increasing output torque as depicted by curve 26 for a decreasing speed.

Referring now to FIGURE 3, it will be observed that the primary unit 12 is energized by a poly-phase alternating current source such as a three-phase 60 cycle power supply. Accordingly, the supply lines 20 include three power phase lines 28, 30 and 32 respectively connected to the Y-connected winding phases 34, 36 and 38 in the stationary stator assembly 40 associated with the primary unit 12. Also associated with the primary unit 12, is a multi-pole rotor assembly generally referred to by reference numeral 42 such as a four pole armature winding with a three phase winding arrangement including the winding phases 44, 46 and 48. The armature rotor assembly 50 associated with the secondary unit 16, is identical to the rotor assembly 42 and hence also includes three winding phases 52, 54 and 56. The armature winding phases of the rotor assemblies 42 and 50, are electrically interconnected by conductors 58, 60 and 62 so that the currents conducted in the respective armature windings, are opposite in phase rotation. Thus, when the rotor assembly 14 is at standstill, the rotor assembly 50 by virtue of its magnetic coupling to the stator assembly 64 in the secondary unit 16, will produce therein a magnetic field rotating in a direction opposite to the rotation of the magnetic field produced in the stator assembly 40 associated with the primary unit 12. The stator assembly 64 therefore also includes three winding phases 66, 68 and 70 connected in a Y-arrangement for supplying a three phase alternating current to an output circuit by means of the output phase lines 72, 74 and 76. The output motor 22 being connected to the output phase lines, will therefore be supplied with AC current at a regulated frequency in order to control the output speed and torque thereof as will be hereafter further explained.

Figure 5:
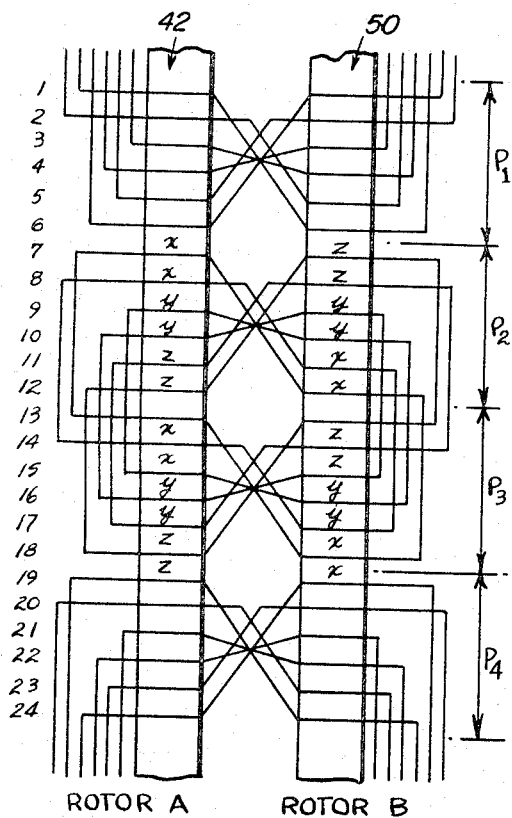
FIGURE 5 is an armature wiring diagram associated with the unit shown in FIGURE 4.

Referring now to FIGURES 4 and 5, it will be observed that the primary and secondary units 12 and 16 may be mounted within a frequency control unit housing 78 with the stator assemblies 40 and 64 thereof being fixedly mounted in axially spaced relation to each other. The rotor assemblies 42 and 50 associated with the stator assemblies 40 and 64, are mounted on the common rotor shaft 14 which supports the armature windings for mechanical rotation together. The input power lines 20 are therefore connected through the housing to the primary stator assembly 40 through the input connecting terminal 80 while the output phase lines from the secondary stator assembly 64 extend through the output terminal 82 of the housing 78. As noted in FIGURE 4, the windings associated with the stator assemblies 40 and 64, are electrically independent of each other whereas the windings associated with the rotor assemblies 42 and 50 are electrically interconnected as aforementioned in connection with FIGURE 3. FIGURE 5 thus shows the armature winding diagram for the interconnected windings of the rotor assemblies 42 and 50 each being identical in structure and arrangement including for example 24 armature conductor slots establishing four magnetic poles P1, P2, P3 and P4 with two turns per pole per phase. It will also be noted in FIGURE 5, that the pole phases of the respective rotor assemblies are so interconnected that the conductors within corresponding slots of the rotor assemblies will be conducted in opposite phase rotation as aforementioned in connection with the circuit diagram of FIGURE 3.

With continued reference to FIGURES 3 and 4, it will be observed that the rotor shaft 14 also mounts a drive control rotor assembly 84 which may also be of the four pole type having a three phase armature winding including the winding phases 86, 88 and 90. The winding phases are interconnected in a star arrangement with the output terminals thereof being electrically connected through the slip rings 92, 94 and 96 to a speed control component 98. The speed control component 98 as shown in FIGURE 3, includes three interconnected variable phase resistors 100 by means of which the resistance of the armature windings are varied in order to regulate the speed of the rotor shaft 14 by the rotor assembly 84 when its associated stator assembly 102 is supplied with electrical energy from the three phase power lines 20.

The stator assembly 102 also includes three winding phases 104, 106 and 108 interconnected in a delta-arrangement the terminals of which are connected through the closed switch section 110 and the variable acceleration control resistors 112 to the power phase lines 28, 30 and 32. Thus, in the illustrated closed position of the switch section 110, energy supplied to the stator assembly 102 will accelerate the rotor shaft 14 under control of the speed control resistors 100 toward the synchronous speed associated with the stator assembly 102 corresponding to the frequency of the alternating current supplied thereto by the power lines 20. The switch section 110 is provided with an interlock 114 so that when it is closed, the switch section 116 is maintained open. Accordingly, upon closing of the switch section 116, the switch section 110 is opened and center taps on the winding phases 104, 106 and 108 are then interconnected with the power phase lines through the acceleration control resistors 112 and the phase windings are converted into a Y-arrangement establishing double the number of magnetic poles or eight poles in order to retard rotation of the rotor assembly 84. Thus, with the switch section 116 closed, rotation of the rotor shaft 14 may be decelerated under control of the acceleration control resistors 112.

From the foregoing description, the construction, operation and utility of a motor system as described in connection with FIGURES 1 through 5, will become apparent. As hereinbefore indicated, the rotor assemblies 42 and 50 associated with the primary and secondary units 12 and 16 are identically wound but electrically interconnected so as to conduct corresponding current in opposite phase rotation. When the rotor shaft 14 is stationary, the phase currents induced in the rotor assembly 42 by rotation of the magnetic field in the stator assembly 40 associated therewith, will conduct current in the rotor assembly 50 in opposite phase rotation to thereby produce a magnetic field in the stator assembly 64 which rotates in a direction opposite to the magnetic field in the stator assembly 40. As the rotor shaft 14 is rotated in a forward direction, rotating both of the rotor assemblies 42 and 50 in the same direction, the rotation of the magnetic field in the stator assembly 64 will be reduced. Inasmuch as the magnetic field in the input stator assembly 40 is rotating at a synchronous speed corresponding to the frequency of the alternating current supplied thereto by the power lines 20, rotation of the rotor shaft 14 in the same direction will reduce the rotational speed of the magnetic field in the output stator assembly 64 to zero when mechanical rotation is equal to one-half the synchronous speed of the rotating field in the input stator assembly 40. When this forward rotation of the rotor shaft 14 exceeds one-half the synchronous speed, rotation of the magnetic field within the output stator assembly 64 will be reversed so that it will be rotating in the same direction as the magnetic field in the input stator assembly. Thus, the rotor shaft 14 may be increased in speed beyond one-half synchronous speed until rotation of the magnetic field within the output stator assembly approaches full synchronous speed in the same direction as the rotating magnetic field in the input stator assembly. Acceleration of the rotor shaft 14 to a speed exceeding one-half the synchronous speed, is achieved under control of the speed control resistors 100 when the switch section 110 is closed as aforementioned. When the rotor shaft 14 is within the operative speed range, the speed thereof may be regulated, with the switch section 116 closed, under control of the acceleration resistors 112. Accordingly, the output frequency of the output stator assembly 64 may be regulated in order to prescribe the output speed of the synchronous motor 22 exhibiting the output torque characteristics depicted in FIGURE 2. The four pole, three-phase star arrangements described in connection with the primary and secondary units 12 and 16, have been found to operate in the motor systems of the present invention from actual performance tests. It should however be appreciated, that other poly-phase connections and variations in the number of poles are possible including arrangements operating from a single phase supply with appropriate changes in the speed control circuit and by the addition of a starting winding and switch.

Figure 7:
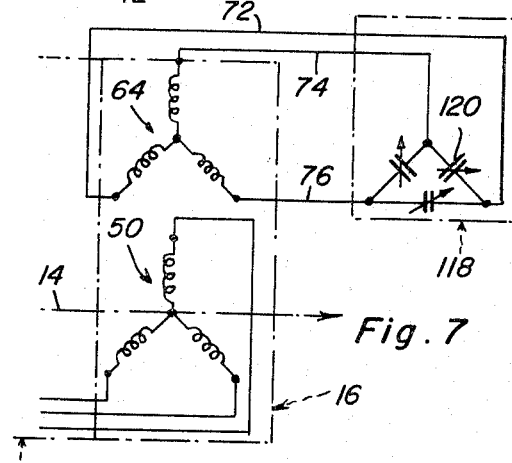
FIGURE 7 is a partial electrical circuit diagram corresponding to the motor system illustrated in FIGURE 6.

Referring now to FIGURES 6 and 7, it will be observed that another motor system is depicted wherein the same primary unit 12 and secondary unit 14 is utilized. However, the load is applied directly to the rotor shaft 16 on which the rotor assemblies 42 and 50 are mounted. The speed control unit 18 is however, eliminated and the output of stator assembly 64 of the secondary unit 16 is connected to a capacitive circuit 118. The capacitive circuit includes a three-phase delta connected arrangement of capacitors 120 connected across the winding phases of the stator assembly 64. In such a motor system, the load connected to the rotor shaft 14 may be driven with substantially constant output power characteristics utilizing approximately 1 millifarad per H.P. for the capacitors 120 and speed may be controlled between zero and one-half synchronous speed by varying the amount of capacity in the circuit. In an experimental model based upon the motor system depicted in FIGURES 6 and 7, a reduction in the output speed of the rotor shaft 14 to one-tenth of the original value upon loading thereof, multiplied the output torque twelve times while the current was divided by 2½. The reduction in current with increasing load is apparently due to an improvement in the power factor of the motor system at low speeds. Thus, the motor system shown in FIGURES 6 and 7 if properly designed can run extremely efficiently and at the same time avoid heating due to overloads.

Figure 9:
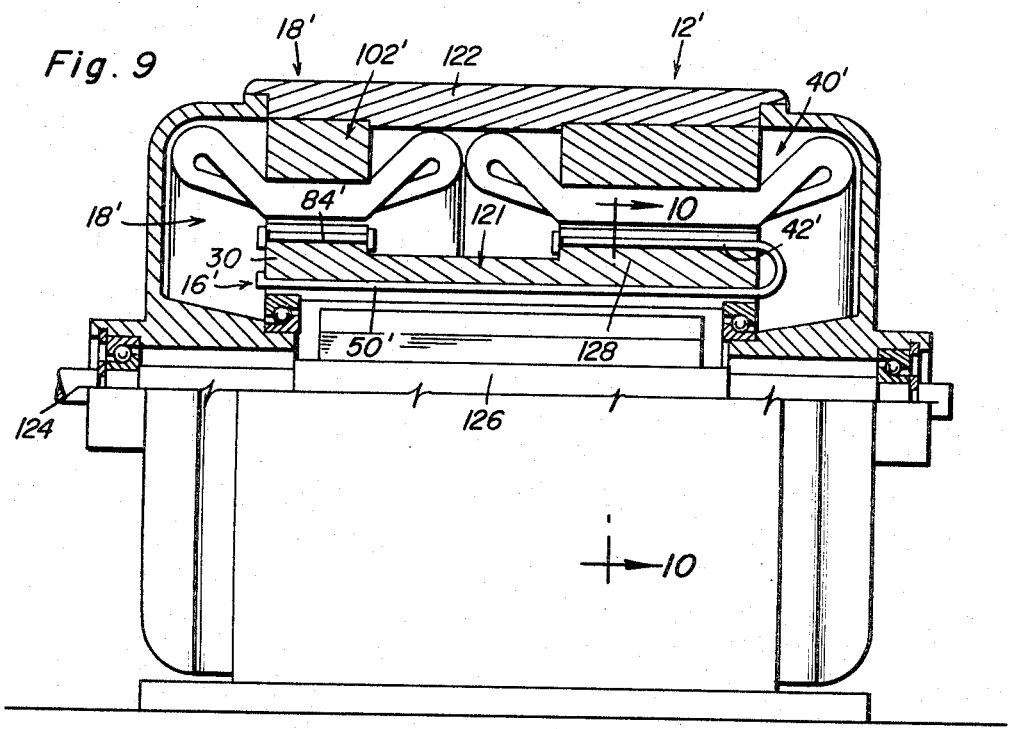
FIGURE 9 is a partial sectional view of a motor unit corresponding to the motor system illustrated in FIGURE 8.
Figure 10:
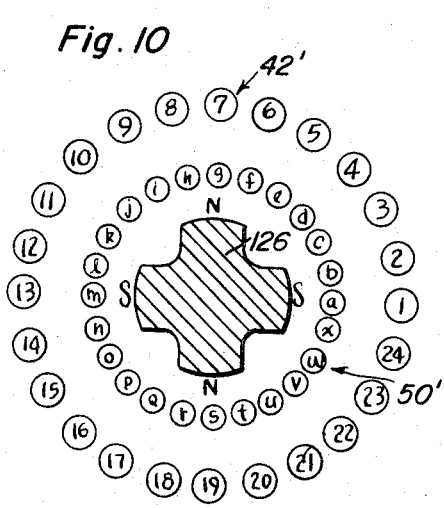
FIGURE 10 is a partial simplified sectional view taken substantially through a plane indicated by section line 10—10 in FIGURE 9 illustrating the rotor winding arrangement.
Figure 11:
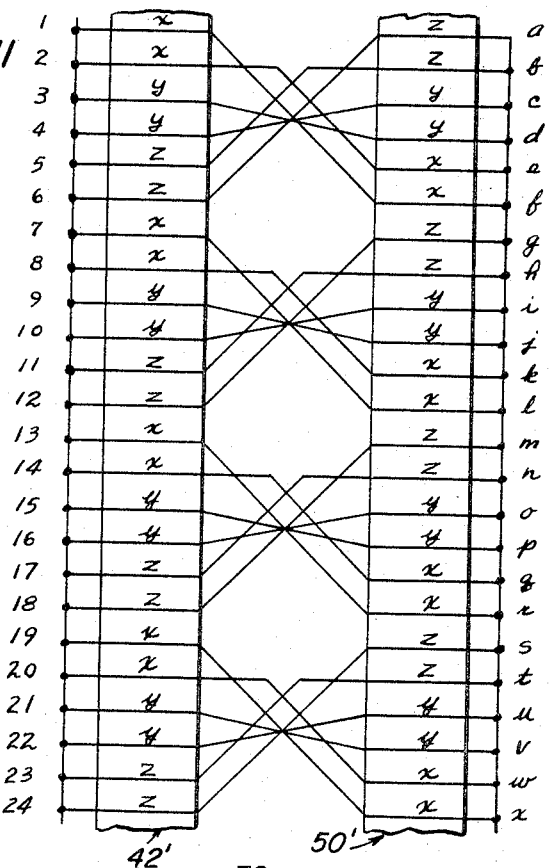
FIGURE 11 is an armature winding diagram corresponding to the rotor winding assembly shown in FIGURES 9 and 10.

Referring now to FIGURE 8, a third type of motor system in accordance with the present invention is schematically shown therein employing a primary unit 12′, a secondary unit 16′ and a control unit 18′ associated with a common winding support rotor 121. Thus, in this form of motor system, the three-phase power lines 20 are again connected to the primary unit 12′ and the control unit 18′ as described in connection with the motor system of FIGURE 1. Also, the primary and secondary units 12′ and 16′ are electrically interconnected as described in connection with FIGURE 3 so that the corresponding currents will be opposite in phase rotation in order to reverse the rotation of the magnetic field in the input stator assembly associated with the primary unit 12′. In the case of the motor system illustrated in FIGURE 8, the secondary unit 16′ directly produces the mechanical output unlike the arrangement described in connection with FIGURE 1. Thus, the motor system of FIGURE 8 may be housed within a single unit housing 122 as shown in FIGURE 9 which centrally journals an output shaft 124. The output shaft 124 mounts an axially elongated rotor 126 which may be in the form of a four pole permanent magnet as more clearly seen in FIGURE 10. It should of course be appreciated that the rotor 126 could also be wound with the winding circuit brought out to slip rings and connected through a silicon controlled rectifier to an electronic circuit sensitive to power factor in order to maintain the power factor of the motor system at any desired value for all conditions of operation. In any event, the rotor 126 is magnetically coupled to the tubular rotor assembly 121 on which all of the windings associated with the units 12′, 16′ and 18′ are mounted. The primary unit 12′ therefore includes the input stator assembly 40′ similar in construction and operation to the input stator assembly 40 associated with the motor system shown in FIGURE 3. The input stator assembly 40′ is magnetically coupled to the portion of the tubular rotor assembly 121 which mounts the armature winding assembly 42′. Thus, the conductors of the armature winding assembly 42′ are exposed to the magnetic field of the stator assembly 40′ by being disposed in externally formed conductor slots in the right hand portion 128 of the tubular rotor assembly 121 as shown in FIGURE 9. Conductor slots are also formed internally of the tubular rotor assembly for receiving the winding conductors of the rotor winding assembly 50′. The winding assemblies 42′ and 50′ are electrically interconnected as described in connection with the rotor assemblies 42 and 50 in FIGURE 3 in order to reverse the rotation of the magnetic field transferred from the input stator assembly 40′ to the axially elongated rotor 126. Accordingly, the winding assemblies 42′ and 50′ are interconnected as depicted in the armature winding diagram of FIGURE 11. Also mounted on the left hand portion 130 of the tubular rotor assembly, is the rotor winding assembly 84′ disposed within the magnetic field of the stator assembly 102′ associated with the speed control unit 18′. The motor control circuit associated with the unit 18′ is similar to that described in connection with the motor unit 18 of FIGURE 3 whereby the rotational speed of the tubular rotor assembly 121 may be controlled so that it may operate within the rotational speed range aforementioned between one-half and the full synchronous speed of the rotating magnetic field associated with the input stator assembly.

From the foregoing description, operation of the motor system illustrated by FIGURES 8 through 11, will become apparent. When the rotor 121 is stationary, the rotating magnetic field of the input stator assembly 40′, induces current in the conductors of the winding assembly 42′ so connected to the winding assembly 50′ that a reversal in phase rotation occurs. The magnetic field induced internally of the tubular rotor 121 therefore rotates in a direction opposite to the rotating magnetic field in the input stator assembly 40′ and at the same synchronous speed when the rotor 121 is at rest. As the speed control section 18′ accelerates the tubular rotor 121 to one-half the synchronous speed, in the direction of rotation of the magnetic field within the input stator assembly 40′, the combined mechanical rotation of the tubular rotor 121 and the reverse rotation of the magnetic field induced by the winding assembly 50′, produces a stationary magnetic field in the rotor 126. Therefore, as the speed of the tubular rotor is increased above one-half synchronous speed, the magnetic field produced by the winding assembly 50′ in the rotating tubular rotor pulls the rotor 126 with it in the same forward direction. Accordingly, the speed of the output shaft 124 connected to the rotor 126 may be varied from zero to a value approaching the full synchronous speed of the input stator assembly. Thus, the output speed of the motor system illustrated in FIGURES 8 through 11 as in the case of the motor system described in connection with FIGURES 1 through 5, will be equal to twice the common rotor (121) speed minus the synchronous speed of the input stator assembly dependent upon the frequency of the alternating current supply. In the case of the motor system 10 described in FIGURES 1 through 5, the output is derived electrically from the secondary unit by a rotating magnetic field within a stationary stator assembly while in the motor system of FIGURES 8 through 9, the output is mechanically derived from a rotor magnetically coupled to the common rotor assembly.

From the foregoing description, it will be apparent that the primary and secondary motor units are common to each of the described motor systems. With appropriate changes in other factors, it will be appreciated that the poles of the primary and secondary sections may be made unequal in number and thereby vary the operating speed range for the motor system. This may be desirable where a relatively constant horse-power motor is desired as discussed in connection with the motor system of FIGURES 6 and 7. In such a case, a greater number of poles in the secondary section 16, would reduce the amount of capacity required for the capacitors 120. It will also be appreciated, that other methods of speed control may be utilized in connection with the motor systems respectively illustrated in FIGURES 1 and 8.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a self-excited AC motor having a rotor winding and a stator winding connected to a source of alternating current producing a magnetic field electrically rotating at a synchronous speed dependent upon the frequency of said alternating current, a motor control system including, armature winding means electrically connected to said rotor winding for conducting current opposite in phase rotation to the current induced in said rotor winding, output means magnetically coupled to the armature winding means for conducting a magnetic field rotating relative to the rotor winding, winding support means supporting the armature winding means and the rotor winding for mechanical rotation in the same direction, means operatively connected to said winding support means for regulating the speed thereof between one-half and the full synchronous speed of the stator winding, said means operatively connected to the winding support means comprising a control rotor connected to the winding support means, a control stator magnetically coupled to the control rotor, control windings respectively mounted on the control rotor and stator, variable resistance means connected to the control windings for varying the acceleration and deceleration of the winding support means, and switch means operatively connecting the control winding of the control stator to the source of alternating current for alternatively rendering the control rotor operative to accelerate or decelerate the winding support means, said output means including a stationary stator winding electrically conducting current alternating at a variable frequency corresponding to rotation of the magnetic field thereof equal to twice the mechanical speed of the rotor winding minus the synchronous speed, and a synchronous output motor connected to the stationary stator winding.

2. In combination with a self-excited AC motor having a rotor winding and a stator winding connected to a source of alternating current producing a magnetic field electrically rotating at a synchronous speed depending upon the frequency of said alternating current, a motor control system including, armature winding means electrically connected to said rotor winding for conducting current opposite in phase rotation to the current induced in said rotor winding, output means magnetically coupled to the armature winding means for conducting a magnetic field rotating relative to the rotor winding, winding support means supporting the armature winding means and the rotor winding for mechanical rotation in the same direction, means operatively connected to said winding support means for regulating the speed thereof between one-half and the full synchronous speed of the stator winding, said output means including a stationary stator winding electrically conducting current alternating at a variable frequency corresponding to rotation of the magnetic field thereof equal to twice the mechanical speed of the rotor winding minus the synchronous speed, said means operatively connected to the winding support means comprising, a load tending to increase the power factor of the motor, and capacitive circuit means connected to the stationary stator winding for improving the power factor whereby said load is driven with substantially constant output power.

3. A motor control system comprising, an output synchronous motor, a source of current alternating at a constant frequency, frequency control means operatively connecting said source to the output motor for supply of current alternating at a regulated frequency, and speed control means connecting said source to the frequency control means for controlling said regulated frequency, said frequency control means comprising, a rotor mounting three armature assemblies, a housing fixedly mounting three stator assemblies respectively coupled magnetically to the armature assemblies, means connecting a first of the stator assemblies to the source of alternating current for producing a magnetic field therein rotating in a forward direction, means connecting a second of the stator assemblies to the output motor for supply of current at said regulated frequency corresponding to electrical rotation in said forward direction, means electrically interconnecting two of said armature assemblies associated with the first and second stator assemblies for conducting current in opposite phase rotation, and means connecting the third of said armature and stator assemblies to the speed control means for mechanical rotation of the rotor in said forward direction opposite in phase rotation to the current conducted through the armature assembly associated with the second stator assembly.

4. A multispeed, self-excited AC motor assembly comprising, a housing, a rotor rotatably mounted by the housing having a plurality of pole faces, an axially elongated winding support rotatably mounted by the housing in operative relation to the rotor, a pair of axially spaced stators fixedly mounted by the housing in operative relation to the winding support, a source of alternating current connected to one of the stators for producing a magnetic field therein rotating at a synchronous speed in one direction relative to the rotor, a primary winding mounted on the winding support in the magnetic field of said one stator, a secondary winding mounted on the winding support and electrically connected to the primary winding for conducting current opposite in rotational phase to said one direction, a control winding mounted on the winding support electrically independent of the other windings and within the magnetic field of the other of the stators and control means operatively connecting said source to the other stator for producing rotation of the winding support in said one direction at a speed exceeding one-half the synchronous speed of said one of the stators.

References Cited

UNITED STATES PATENTS

| | | | |
|---|---|---|---|
| 2,444,077 | 6/1948 | Weathers | 318—49 X |
| 2,624,028 | 12/1952 | Annis | 318—197 X |
| 2,787,747 | 4/1957 | Drummond | 318—205 X |
| 3,263,143 | 7/1966 | Moressee et al. | 321—62 X |

ORIS L. RADER, *Primary Examiner.*

G. Z. RUBINSON, *Assistant Examiner.*